July 7, 1964  J. S. SCIUTO, JR  3,140,072
LOCKING MECHANISM IN QUICK-CONNECT-DISCONNECT COUPLING
Filed April 16, 1962  2 Sheets-Sheet 1

INVENTOR.
JOSEPH S. SCIUTO, JR.
BY Cohn and Powell
ATTORNEY.

July 7, 1964  J. S. SCIUTO, JR  3,140,072
LOCKING MECHANISM IN QUICK-CONNECT-DISCONNECT COUPLING
Filed April 16, 1962  2 Sheets-Sheet 2

INVENTOR
JOSEPH S. SCIUTO JR.

BY *Cohn and Powell*

ATTORNEY.

United States Patent Office 3,140,072
Patented July 7, 1964

3,140,072
LOCKING MECHANISM IN QUICK-CONNECT-DISCONNECT COUPLING
Joseph S. Sciuto, Jr., Crestwood, Mo., assignor to Stile-Craft Manufacturers, Inc., St. Louis, Mo., a corporation of Missouri
Filed Apr. 16, 1962, Ser. No. 187,552
19 Claims. (Cl. 251—89.5)

This invention relates generally to improvements in a quick-connect-disconnect coupling, and more particularly to improvements in a hose coupling of this type having a locking mechanism that is directly actuated by a plug.

The coupling includes a sleeve mounted on a tubular body for movement between limits, the body being provided with a socket adapted to receive a tubular plug. It is an important objective to provide a locking mechanism that operatively interconnects the sleeve and body to retain the sleeve in a predetermined relative position when the plug is withdrawn, and which is directly actuated by the plug upon insertion into the socket whereby the sleeve is released for movement from the predetermined locked position.

Another important objective is achieved by the above structural arrangement in that the sleeve is released and conditioned to actuate other component parts of the coupling only when the plug is fully inserted into its cooperating body socket.

The sleeve can be operatively connected to a latch means so as to actuate the latch means to hold or release the plug upon movement of the sleeve after the sleeve has been released by the locking means upon insertion of and actuation by th plug.

Other advantages are realized in that the sleeve can be operatively connected to a valve means also so as to actuate the valve means to control flow through the coupling upon sleeve movement after release by the plug insertion. Under these circumstances in which the sleeve operates both the latch means and valve means, the sleeve is conditioned for actuating movement only when the plug is fully inserted into the body socket, the sleeve selectively causing the latch means to retain the plug and causing the flow through the valve means, and conversely, releasing the plug and stopping flow through the valve means.

Still another important object is afforded by constructing the locking means with a first element that is carried loosely by the sleeve, and a second element that is carried loosely by the body, the first element operatively interconnecting the sleeve and body to retain the sleeve in one relative position when the plug is withdrawn, the plug engaging the second element when inserted so that the second element disengages the first element from the body to release the sleeve for movement relative to the body.

An important objective is obtained by the provision of a resilient means acting on the first element carried by the sleeve and tending to urge the first element toward the body so that the first element automatically and effectively interlocks with the body in one sleeve position when the plug is withdrawn from its cooperating socket.

Another important object is achieved by the structural arrangement of the locking means such that a first element carried by the sleeve is urged by a resilient means toward the body, the body being provided with a hole communicating with the plug socket in which a second element is loosely carried, the first element snapping into the hole to retain the sleeve relative to the body in one position when the plug is withdrawn. When the plug is inserted, the plug engages the second element, that in turn pushes the first element out of the hole against the loading of the resilient means to release the sleeve.

Yet another important object is realized by the provision of a ring embracing the sleeve and overlying the first locking element, the resilient means being located between the ring and sleeve and associated with the first element so as to tend to urge the first element toward the body. The ring holds the first locking element and resilient means in place and in operative association on the sleeve.

An important object is afforded by the provision of a leaf spring attached to the first locking element and fixed between the sleeve and ring, the sleeve and ring providing a chamber therebetween behind the first element and the attached portion of the spring into which such parts can move when the first element is displaced and disengaged from the body.

It is an important object to provide a quick-connect-disconnect coupling that is simple and endurable in construction, economical to manufacture and assemble, highly efficient in operation, and which can be readily operated by any one without any instruction.

The foregoing and numerous other objects and advantages of the invention will more clearly appear from the following detailed description of a preferred embodiment and a modification particularly when considered in connection with the accompanying drawings, in which.

Figure 1:
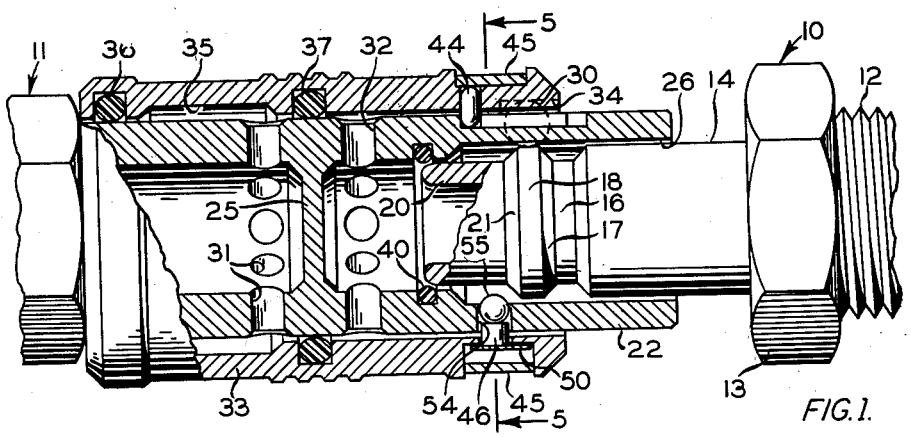
FIG. 1 is a side elevational view of the coupling, partly in cross section as seen along a vertical plane passed through the longitudinal axis, the sleeve being locked in its predetermined position relative to the body.

Referring now by characters of reference to the drawings, and first to FIG. 1, it is seen that the quick-connect-disconnect coupling includes a male member generally indicated at 10 and a cooperating female member referred to at 11.

The male member 10 consists of a threaded fitting 12 adapted to be connected selectively to a hose or other similar line of a fluid system, a nut 13 formed integrally with fitting 12 facilitates attachment of the male member 10 to its associated hose. Extending forwardly from and formed integrally with nut 13 is a plug 14. The male member 10 is tubular as provided by a longitudinal passageway 15 (FIG. 2) extending through plug 14, nut 13 and fitting 12.

An annular groove 16 is provided about the periphery of plug 14. The forwardmost margin defining the groove 16 is inclined forwardly to provide a cam shoulder 17. The plug 14 is provided with a reduced end portion 20 and a rearwardly inclined cam shoulder 21. The cam shoulders 17 and 21 are interconnected by a flat land 18.

The female member 11 includes a tubular body 22, the rearmost end of which has an integral nut 23. The interior of this rear end of body 22 is provided with threads 24, adapted to receive a fitting (not shown) that connects an associated hose with the female member 11.

Formed across the body 22 at a distance spaced inwardly from its front end, is a partition 25 that divides the internal bore. The partition 25 provides a socket 26 forwardly of the petition which is adapted to receive the plug 14.

Figure 3:
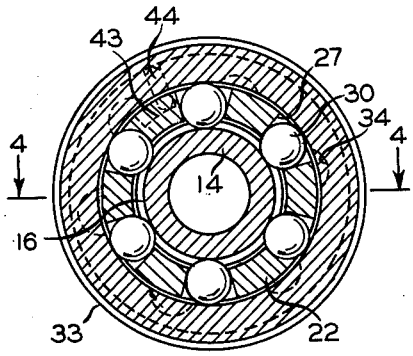
FIG. 3 is a cross sectional view as seen along line 3—3 of FIG. 2.

The latch means includes a plurality of spaced apertures 27 formed peripherally about the body 22 and communicating with the socket 26. In the preferred embodiment, a total of six apertures 27 are provided which are located in 60 degree relationship as best seen in FIG. 3. It will be noted that the apertures 27 are tapered inwardly toward the socket 26 for reasons which will later appear.

Located in each of the apertures 27 is a ball 30 constituting a latching element. The latching balls 30 are adapted to move radially into and out of the socket 26. However, it will be noted that the tapered apertures 27 engage the balls 30 to preclude the balls from falling freely into socket 26.

The valve means includes a first series of regularly spaced valve ports 31 formed peripherally about the body 22 immediately to the rear of partition 25. In the preferred embodiment, a total of eight valve ports 31 are provided at 45 degree relation.

A corresponding series of valve ports 32 are formed in body 22 immediately in front of partition 25. These valve ports 32 are arranged just to the rear of the reduced end portion 20 of plug 14 when the plug 14 is inserted into the socket 26 so as to provide a direct communication with the passageway 15 through such plug.

The mechanism for effectively and operatively actuating the latch means and valve means in this coupling consists of a sleeve 33 slidably mounted on body 22. The front end of sleeve 33 is provided with a plurality of shallow recesses 34 spaced peripherally about the internal bore of such sleeve, the number of recesses 34 corresponding to the number of latching balls 30. In one rotative position of sleeve 33 in its fully retracted limit illustrated in FIG. 1, the recesses 34 align with the balls 30 and are adapted to receive the balls 30 to permit the latching balls 30 to move outwardly of the plug 22 and thereby disengage operatively from plug 14.

Figure 2:
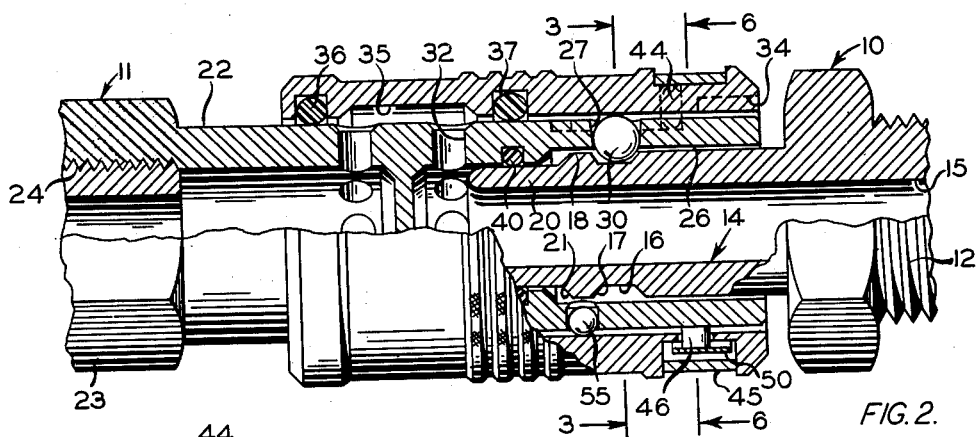
FIG. 2 is a cross sectional view similar to FIG. 1, but illustrating the actuating sleeve released from the body and moved relative to said body.

Formed internally at the rear of sleeve 33 is a valve recess 35 of sufficient length to bridge the valve ports 31 and 32 when the sleeve 33 is located in its fully extended limit illustrated in FIG. 2. This valve recess 35 places the valve ports 31 and 32 in direct communication. At each end of the valve recess 35, the sleeve 33 is provided with an annular groove adapted to receive O-rings 36 and 37 constituting sealing members. The O-rings 36 and 37 are resilient and engage the periphery of body 22 in sealing relation.

When the sleeve 33 is fully extended as shown in FIG. 2, the O-rings 36 and 37 engage the body 22 on opposite sides of the valve ports 31 and 32, thereby precluding leakage of fluid under pressure from ports 31 and 32 between the body 22 and sleeve 33, and enabling the flow of fluid under pressure to follow the path directly through valve ports 31, into valve recess 35, through valve ports 32 and thence into the socket 26.

When the sleeve 33 is fully retracted as shown in FIG. 1, the O-ring 37 engages the body region between the valve ports 31 and 32 to disrupt flow between such valve ports. Again, the pair of O-rings 36 and 37 preclude escape or leakage of fluid under pressure from valve ports 31 between the body 22 and sleeve 33.

The interior of body 22 is provided with an annular groove at its socket 26, the groove being adapted to receive and position an O-ring 40. The O-ring 40 is adapted to engage the reduced end portion 20 of plug 14 when the plug is inserted into socket 26 to provide a seal between plug 14 and body 22.

A control means operatively interconnects the sleeve 33 and the body 22 to regulate reciprocative movement of the sleeve 33 between retracted and extended limits and to regulate rotative movement of the sleeve in such limits.

Particularly, the control means includes a substantially C-shaped guide means formed in body 22 consisting of a longitudinal groove 41 and transverse grooves 42 and 43 at opposite ends of longitudinal groove 41. Carried by sleeve 33 is a pin 44 constituting a follower that is received in and engages the C-shaped guide means 41–43. A retaining ring 45 is carried by the periphery of sleeve 33 and overlies the pin 44 to hold the pin 44 in assembly. The ring 45 is resilient and can be easily removed to enable withdrawal of pin 44, and thereby enable sleeve 33 to be disassembled from the body 22, if desired.

Figure 5:
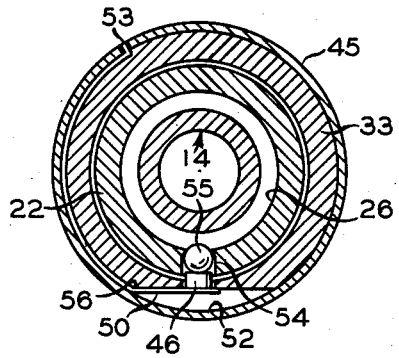
FIG. 5 is a cross sectional view as seen along line 5—5 of FIG. 1.
Figure 6:
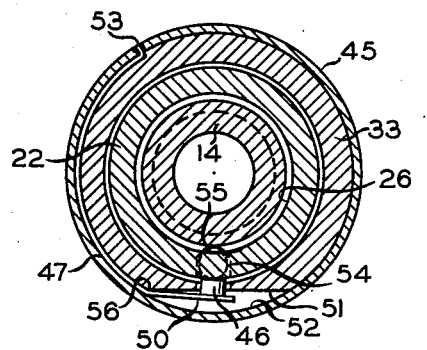
FIG. 6 is a cross sectional view as seen along line 6—6 of FIG. 2.

The locking means operatively interconnecting the body 22 and the sleeve 33 and actuated by the plug 14 upon insertion includes a pin 46, constituting a first element, carried by and reciprocatively mounted in the sleeve 33 for movement toward and away from the body 22. A leaf spring 47 is disposed and held securely between the ring 45 and the sleeve 33. One end 50 of spring 47 is attached to the pin 46 and tends to urge the pin 46 in a direction toward the body 22. As is best shown in FIGS. 5 and 6, the body 22 is provided with a flat surface 51 against which the spring end 50 bears when the pin 46 is urged inwardly into locking engagement with the body as is illustrated in FIG. 5. Because of this flat surface 51, a chamber 52 is provided between the body 22 and ring 45 immediately behind the pin 46, the spring end 50 and its attached pin 46 moving into such chamber 52 when the pin 46 is operatively disengaged from the body 22.

It will be noted that the ring 45 is split to provide spaced ends. The opposite end of the leaf spring 47 is provided with an out-turned lip 53 that interfits between the spaced ends of the split ring 45 to hold the spring 47 in place. The spaced ends of the split ring 45 and its connected spring lip 53 are located a considerable distance away from the movable spring end 50 and attached pin 46 in order to preclude any spreading of the ring 45 in the event any pressure is exerted directly on the ring 45 by the pin 46 as it moves outwardly into chamber 52.

The body 22 is provided with a hole 54 underlying the sleeve 33 and communicating with the socket 26. Carried loosely by the body 22 in the hole 54 is a locking ball 55, the ball 55 being extensible into the socket 26 and into the path of the plug 14. The hole 54 and the ball 55 are aligned with pin 46 in one predetermined position of sleeve 33 relative to body 22 as is shown in FIGS. 1 and 5. When in this predetermined position, the spring end 50 urges the pin 46 into the hole 54. It is seen that the pin 46 thereby locks the sleeve 33 with the body 22 and thereby precludes any relative movement. Furthermore, the pin 46 urges the ball 55 inwardly of the socket 26. It will be understood upon later description and explanation, that this locking action takes place only when the plug 14 is withdrawn from socket 26.

Upon insertion of the plug 14, the camming surface 21 engages the locking ball 55 and urges the ball outwardly. The ball 55 in turn pushes the locking pin 46 out of the hole 54 against the loading of the spring end 50. The sleeve 33 is then released for movement from the predetermined position relative to the body 22 in order to actuate the latch means and the valve means.

It will be noted that the sleeve 33 moves in a counterclockwise direction as viewed in FIG. 5 after the pin 46 is moved out of hole 54 and clears the body 22. The fulcrum 56 of the spring end 50 is located at the left hand side of the flat surface 51 in order that the right side of pin 46 clears the body 22 first as the pin 46 swings in an arc about the fulcrum 56. This particular structural arrangement precludes the pin 46 from hanging in the hole 54 and assures a quick disconnection and easy turning of the sleeve 33.

It is thought that the operation and functional advantages of the coupling have become fully apparent from the foregoing detailed description of parts, but for completeness of disclosure the connection and disconnection of the coupling members will be briefly described.

It will be assumed that the coupling members 10 and 11 are detached and that the sleeve 33 is in the fully retracted limit illustrated in FIG. 1 and is rotated in this limit until the pin 44 is located in transverse groove 42. In this position the sleeve 33 is locked against reciprocation. Moreover, in this position of sleeve 33, the front recesses 34 are aligned directly opposite the latching balls 30 so that the balls 30 can be moved outwardly into a plug-unlatched position. Further, the O-ring 37 is located between the valve ports 31 and 32 so that the valve means is closed. Importantly the sleeve 33 is located in its predetermined position relative to the body 22 so that the locking pin 46 is urged into the hole 54 by the leaf spring portion 50 to preclude any relative movement of the sleeve 33 and body 22, the locking ball 55 being pushed by pin 46 into the socket 26 under spring loading.

The flow of fluid under pressure through the female coupling 11 is prevented by the particular location of the O-ring 37. The fluid is in communication with the valve recess 35 through valve ports 31, but cannot flow between the body 22 and sleeve 33 because of the sealing relationship of the O-rings 36 and 37.

First, the plug 14 is inserted into body socket 26. As the plug 14 moves inwardly, the camming shoulder 21 engages the latching balls 30 to move the balls 30 outwardly into the front recesses of sleeve 33. Because the sleeve 33 overlies the balls 30, the balls 30 are retained in the body apertures 27. Next, the O-ring 40 engages the reduced plug end 20 to provide a seal. In addition, the camming shoulder 21 engages the locking ball 55 and moves the locking ball outwardly. When fully inserted, the locking ball 55 is aligned with the plug land 18 and the latching balls 30 are aligned radially with the plug groove 16.

It will be importantly noted that during this insertion of plug 14, the valve mechanism remains closed, and consequently the plug 14 is not subjected to any fluid pressure.

After the plug 14 is fully inserted, the locking pin 46 is pushed out of the body hole 54 by wall 55 to disengage the sleeve 33 operatively from the body 22 for relative movement.

The sleeve 33 is rotated from the predetermined position while in its fully retracted limit. Guiding the sleeve 33 upon such rotative movement, the pin 44 moves along the transverse groove 42 into the rear end of longitudinal groove 41. As the sleeve 33 is rotated to the position defined above, the sleeve recesses 34 move out of alignment with the latching balls 30 and the sleeve 33 cams the latching balls 30 inwardly into the socket 26, and into latching engagement with the plug 14. It will now be noted that the plug 14 is latched, yet the valve mechanism is still closed.

Then, the actuating sleeve 33 is moved forwardly to the other extended limit shown in FIG. 2. During this forward movement of sleeve 33, the pin 44 moves from the rear end to the front end of longitudinal groove 41. As the sleeve 33 moves forwardly, the O-ring 37 clears the body region between the valve ports 31 and 32, and in fact begins to ride over the valve ports 32 to the opposite side. Also, it will be seen that the locking pin 46 rides along the outer surface of the body 22 under the loading of the spring end 50.

In the fully extended limit of sleeve 33, the O-rings 36 and 37 engage the body 22 on opposite sides of the valve ports 31 and 32. Therefore, the valve ports 31 and 32 are placed in direct communication by the sleeve valve recess 35. Fluid is now allowed to flow under pressure from the female line outwardly through the valve ports 31, into the passageway afforded by the valve sleeve recess 35, thence into the socket 26 through the valve ports 32, and thence through the passageway 15 formed in the male member 10.

In this extended limit of sleeve 33, the recesses 34 are still misaligned relative to the latching balls 30 so that the plug 14 remains latched.

Figure 4:
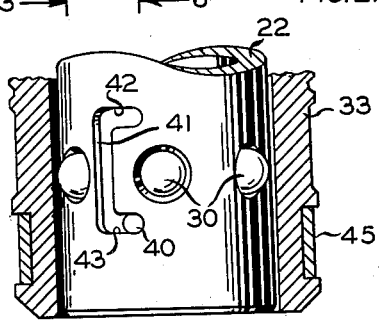
FIG. 4 is a fragmentary cross sectional view as seen along line 4—4 of FIG. 3, the coupling body being illustrated in plan.

The sleeve 33 is then rotated as permitted by the movement of pin 44 into the front transverse groove 43, as shown in FIG. 4. The sleeve 33 is locked in this position against reciprocation, the valve means remains open and the plug 14 remains latched.

It will be noted that the sleeve 33 is locked against reciprocation in each of its limits upon rotation of the pin 44 into the respective transverse grooves 42 and 43. Also it will be realized that the valve means is only closed by the sleeve 33 when the plug is moved longitudinally to its retracted limit and that the plug 14 can only be unlatched when the sleeve 33 is rotated to a locked position while in this retracted limit.

Disconnection of the coupling members 10 and 11 is accomplished by the mere reversal of the above described procedure. For example, the sleeve 33 is rotated to move the pin 44 along tranvserse groove 43 into the front end of longitudinal groove 41, whereby to unlock the sleeve 33. Then, the sleeve 33 is moved rearwardly from its fully extended limit until the O-ring 37 crosses the valve ports 32 and sealingly engages the body region between the valve ports 31 and 32, whereby to stop fluid flow through the coupling. During this retraction of sleeve 33, the pin 44 moves from the front end to the rear end of longitudinal groove 41. The latching balls 30 are maintained in their latched position by engagement with the overlying sleeve 33.

After the valve means is completely closed and the sleeve 33 is located in its fully retracted limit, the sleeve 33 is then rotated to move pin 44 into the rear transverse grove 42. When the sleeve 33 is rotated as described, the sleeve 33 is locked against reciprocation. In addition, as the sleeve 33 moves to its predetermined position relative to the body 22, the locking pin 46 is aligned with its cooperating body hole 54 and bears against the locking ball 55 under the loading of the leaf spring end 50. Also in this position, the sleeve recesses 34 are aligned with the latching balls 30 to permit withdrawal of the plug 14. As the plug 14 is moved outwardly, the cam shoulder 17 forces the latching balls 30 radially outwardly of the apertures 22 into the sleeve recesses 34. The latching balls 30 then ride over the periphery of the plug 14 as the plug is fully withdrawn.

It will be importantly noted that as the plug is withdrawn, the locking pin 46 snaps automatically under the loading of spring end 50 into the body hole 54 to lock the sleeve 33 securely in the predetermined position relative to body 22 in order to preclude all movement. The locking pin 46 urges the locking ball 55 into the body socket 26 so that such locking ball 55 will be engaged by the plug 14 upon subsequent insertion.

A modification of the locking mechanism is shown in FIGS. 7–10 inclusive. In this embodiment, the sleeve 33 is undercut on its inner surface immediately adjacent the body 22 to provide a chamber 60. A resilient spring plate 61 is located in the chamber 60, the spring plate being provided with a center aperture 62 through which a locking pin 63 extends. The pin 63 includes an enlarged head 64 adapted to engage one side of spring plate 61, the head 64 being adapted to interfit the body hole 54 when the sleeve 33 is located in its predetermined position relative to body 22 as explained previously. The shank portion of pin 63 slidably projects into a small radial bore 65 formed in sleeve 63 and communicating with chamber 60.

Figure 7:
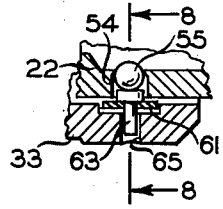
FIG. 7 is a fragmentary cross sectional view of a modification of the locking mechanism with the component parts of the coupling disposed as in FIG. 1.
Figure 8:
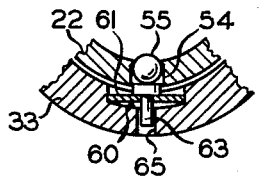
FIG. 8 is a fragmentary cross sectional view of the modified locking mechanism as seen along line 8—8 of FIG. 7.

It will be noted that the principle of operation of the modified embodiment of FIGS. 7–10 is substantially the same as the embodiment previously described. For example, when the hole 54 and the ball 55 are aligned with locking pin 63 in one predetermined position of sleeve 33 relative to body 22 as is shown in FIGS. 7 and 8, the spring plate 61 urges the pin head 64 into the hole 54. It is seen that the pin 63 thereby locks the sleeve 33 with the body 22 and thereby precludes any relative movement. Furthermore, the pin 63 urges the ball 55 inwardly of the socket 26.

Figure 9:
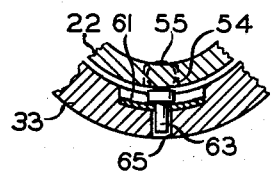
FIG. 9 is a fragmentary cross sectional view of the modified locking mechanism, similar to FIG. 6 showing the locking mechanism released.
Figure 10:
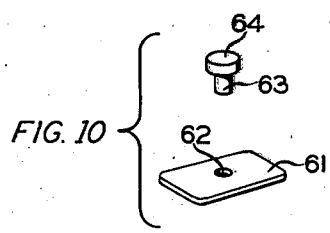
FIG. 10 is an exploded, enlarged perspective view of the spring plate and locking pin in the modification of FIGS. 7–9.

Upon insertion of the plug 14, the camming surface 21 engages the locking ball 55 and urges the ball 55 outwardly. The ball 55 in turn pushes the locking pin 63 out of the hole 54 against the loading of the spring plate 61 as is illustrated in FIG. 9. The sleeve is then released for movement relative to the body 22 in order to actuate the latch means and the valve means.

When the sleeve 33 is subsequently relocated in its predetermined position relative to body 22, the locking pin 63 is aligned with the cooperating body hole 54 and bears against the locking ball 55 under the loading of the spring plate 61. As the plug 14 is withdrawn, the locking pin 63 snaps automatically under the loading of the spring plate 61 into the body hole 54 to lock the sleeve 33 securely in the predetermined position relative to body 22 in order to preclude all movement. The locking pin 63 urges the locking ball 55 into the body socket 26 so that such locking ball 55 will be engaged by the plug 14 upon subsequent insertion.

Although the invention has been described by making detailed reference to a preferred embodiment and a modification, such detail is to be understood in an instructive, rather than in any restrictive sense, many variants being possible within the scope of the claims hereunto appended.

I claim as my invention:

1. In a coupling,
   (a) a tubular plug,
   (b) a tubular body providing a socket adapted to receive said plug,
   (c) a sleeve mounted on said body for movement between limits, and
   (d) a locking means operatively interconnecting said sleeve and body to retain the sleeve in one position when the plug is completely withdrawn, the plug engaging and actuating the locking means when inserted to release the sleeve for movement.

2. In a coupling,
   (a) a tubular plug,
   (b) a tubular body providing a socket adapted to receive said plug,
   (c) a sleeve mounted on said body for movement between limits, and
   (d) a locking means including a first element carried by said sleeve, and a second element carried by said body,
   (e) said first element operatively interconnecting the sleeve and body to retain the sleeve in one position when the plug is withdrawn, the plug engaging the second element when inserted, the second element actuating the first element to release the sleeve for movement.

3. In a coupling,
   (a) a tubular plug,
   (b) a tubular body providing a socket adapted to receive said plug,
   (c) a sleeve mounted on said body for movement between limits, and
   (d) a locking means including a first element carried by said sleeve,
   (e) resilient means engaging said first element and tending to urge said first element toward said body, said first element operatively interconnecting the sleeve and body to retain the sleeve in one position when the plug is withdrawn, and
   (f) a second element carried by said body, the plug engaging the second element to move the second element outwardly when the plug is inserted so that the second element moves the first element out of operative connection with the body whereby to release the sleeve.

4. In a coupling,
   (a) a tubular plug,
   (b) a tubular body providing a socket adapted to receive said plug, the body being provided with a hole communicating with said socket,
   (c) a sleeve mounted on said body for movement between limits, and,
   (d) a locking means including a first element carried by said sleeve,
   (e) resilient means tending to urge the first element toward said body, said first element operatively interfitting said hole to retain said sleeve relative to said body in one position when the plug is withdrawn,
   (f) a second element disposed loosely in said hole and carried by said body, the plug engaging the second element when inserted, the second element moving the first element out of said hole against the loading of said resilient means to release the sleeve for movement relative to said body.

5. In a coupling,
   (a) a tubular plug,
   (b) a tubular body providing a socket adapted to receive said plug,
   (c) a sleeve mounted on said body for movement between limits, and
   (d) a locking means including a first element carried by said sleeve,
   (e) a ring embracing the sleeve and overlying said first element,
   (f) resilient means between said ring and sleeve tending to urge said first element toward said body, said first element operatively interconnecting the sleeve and body to retain the sleeve in one position when the plug is withdrawn, and
   (g) a second element carried by said body, the plug engaging the second element when inserted, the second element actuating the first element to release the sleeve for movement relative to said body.

6. In a coupling,
   (a) a tubular plug,
   (b) a tubular body providing a socket adapted to receive said plug,
   (c) a sleeve mounted on said body for movement between limits, and
   (d) a locking means including a first element carried by said sleeve, the sleeve being provided with a chamber,
   (e) resilient means disposed in said chamber tending to urge said first element toward said body, said first element operatively interconnecting the sleeve and body to retain the sleeve in one position when the plug is withdrawn, and
   (f) a second element carried by said body, the plug engaging and moving the second element when inserted, the second element moving the first element in a direction to release the sleeve for movement relative to said body.

7. In a coupling,
   (a) a tubular plug,
   (b) a tubular body providing a socket adapted to receive said plug, the body being provided with a hole communicating with said socket,
   (c) a sleeve mounted on said body for movement between limits, and
   (d) a locking means including a first element carried by said sleeve, the sleeve being provided with a chamber behind said first element, (e) resilient means disposed in said chamber tending to urge said first element toward said body, said first element operatively interfitting said hole to retain said sleeve relative to said body in one position when the plug is withdrawn, (f) a second element carried loosely by said body in said hole and extending into the path of said plug, the plug engaging the second element when inserted so that the second element moves the first element out of said hole against the loading of said resilient means to release the sleeve for movement relative to said body.

8. In a coupling,
(a) a tubular plug,
(b) a tubular body providing a socket adapted to receive said plug,
(c) a sleeve mounted on said body for movement between limits, and
(d) a locking means including a first element carried by said sleeve, said first element operatively interconnecting the sleeve and body to retain the sleeve in one position when the plug is withdrawn,
(e) a leaf spring attached to said first element tending to urge said first element toward said body,
(f) a ring embracing the leaf spring and sleeve,
(g) a second element carried by said body, the plug engaging the second element when inserted to move the first element outwardly to release the sleeve for movement relative to said body,
(h) the ring and sleeve providing a chamber therebetween behind the first element into which the first element and spring move upon operative disengagement of the first element, from said body.

9. The combination and arrangement of elements as recited above in claim 8, but further characterized in that the said ring is split to provide spaced ends, and that the leaf spring has one end attached to the first element and has the other end retained by said ring between its spaced ends.

10. In a coupling,
(a) a tubular plug,
(b) a tubular body providing a socket adapted to receive said plug,
(c) a sleeve mounted on said body for movement between limits, and
(d) a locking means including a first element reciprocatively mounted and carried by said sleeve for movement toward and away from said body,
(e) a leaf spring engaging said first element tending to urge said first element toward said body,
(f) a ring embracing the leaf spring and sleeve, said ring being split to provide spaced ends, said spring having one end retained by said ring between its spaced ends,
(g) the body being provided with a hole communicating with said socket and aligned with said first element in one position of said sleeve relative to said body,
(h) a second element carried loosely by said body in said hole and extending into the path of said plug,
(i) said first element operatively interfitting said hole to retain said sleeve relative to said body in said one position when the plug is withdrawn, said first element engaging said second element,
(j) the plug engaging the second element when inserted to move the second element outwardly and hence move the first element out of said hole against the loading of said leaf spring to release the sleeve for movement relative to said body,
(k) said ring and sleeve being provided with a chamber therebetween behind the first element into which the first element moves upon disengagement with said hole.

11. In a coupling,
(a) a tubular plug,
(b) a tubular body provided with a socket adapted to receive said plug,
(c) a sleeve mounted on said body for movement between limits,
(d) latch means carried by said body and selectively engageable with said plug, said sleeve actuating said latch means upon movement from a predetermined position relative to said body, and
(e) a locking means operatively interconnecting said sleeve and body to retain the sleeve in said position when the plug is withdrawn, the plug engaging and actuating the locking means when inserted to release the sleeve for movement so as to actuate said latch means indicident to holding or releasing said plug.

12. In a coupling,
(a) a tubular plug,
(b) a tubular body provided with a socket adapted to receive said plug,
(c) latch means carried by said body and selectively engageable with said plug,
(d) valve means controlling the flow through said body,
(e) a sleeve mounted on said body for movement between limits, said sleeve actuating said latch means and valve means upon movement to or from a predetermined position relative to the body, and
(f) a locking means operatively interconnecting said sleeve and body to retain the sleeve in said predetermined position when the plug is withdrawn, the plug engaging and actuating the locking means when inserted to release the sleeve for movement relative to the body incident to actuating the latch means and valve means.

13. In a coupling,
(a) a tubular plug,
(b) a tubular body provided with a socket adapted to receive said plug,
(c) latch means carried by said body and selectively engageable with said plug,
(d) a valve means between the sleeve and body to control flow therethrough,
(e) a sleeve mounted on said body for movement between limits, said sleeve actuating said latch means and valve means upon movement to and from a predetermined position relative to said body, and
(f) a locking means including a first element carried by said sleeve operatively interconnecting the sleeve and body to retain the sleeve in said predetermined position when the plug is withdrawn,
(g) a second element carried by said body and associated with said first element when the sleeve is in said predetermined position,
(h) the plug engaging the second element when inserted so that the second element actuates the first element to disconnect the sleeve operatively from said body for movement of said sleeve to actuate the latch means and valve means.

14. In a coupling,
(a) a tubular plug,
(b) a tubular body provided with a socket adapted to receive said plug,
(c) latch means carried by said body and selectively engageable with said plug,
(d) a valve means between the sleeve and body,
(e) a sleeve mounted on said body for movement between limits, said sleeve actuating said latch means and valve means upon movement to or from a predetermined position relative to the body,
(f) a locking means including a first element carried by said sleeve,
(g) resilient means tending to urge the first element toward said body,
(h) the body being provided with a hole communicating with said socket and aligned with said first element in said predetermined position of said sleeve, said first element operatively interfitting said hole to retain said sleeve relative to said body in said predetermined position when the plug is withdrawn, (i) a second element carried loosely by said body in said hole and extending into the path of said plug, the plug engaging the second element when inserted so that the second element moves the first element out of said hole against the loading of said resilient means to release the sleeve for movement relative to the body incident to actuating said latch means and valve means.

15. The combination and arrangement of elements as recited above in claim 14, but further characterized by the provision of a chamber between said body and said sleeve, said resilient means being disposed in said chamber, the said first element moving into said chamber when removed from said hole.

16. The combination and arrangement of elements as recited above in claim 14, but further characterized by the provision of a ring embracing the sleeve and overlying said first element, the ring and sleeve being provided with a chamber therebetween behind the first element, the resilient means being disposed in said chamber, and the first element moving into said chamber when removed from said hole.

17. The combination and arrangement of elements as recited above in claim 16, but further characterized in that said resilient means consists of a leaf spring having a portion engaging said first element, the spring tending to urge said first element toward said body, the ring embracing the leaf spring and sleeve, and the ring and sleeve providing a chamber therebetween behind the first element and its associated spring portion into which the first element and said spring portion move upon operative disengagement of the first element with said body.

18. The combination and arrangement of elements as recited above in claim 17, but further characterized in that said ring is split having spaced ends, the leaf spring having one end retained by said ring between its spaced ends.

19. In a coupling,
(a) a tubular plug,
(b) a tubular body provided with a socket adapted to receive said body,
(c) latch means carried by said body and selectively engageable with said plug,
(d) a valve means between the sleeve and body for controlling flow therethrough,
(e) a sleeve mounted on said body for movement between limits, said sleeve actuating said latch means and valve means upon movement from a predetermined position relative to the body, and
(f) a locking means including a first element reciprocatively mounted in said sleeve for movement toward or away from said body,
(g) a spring engaging said first element, the sleeve being provided with a chamber receiving said first element and said spring,
(h) the body being provided with a hole under the sleeve which communicates with said socket,
(i) a second element carried by said body loosely in said hole,
(j) said first element operatively interfitting said hole to retain said sleeve relative to said body in said predetermined position when the plug is withdrawn, said first element engaging said second element and extending said second element into the path of said plug, the plug engaging the second element when inserted so that the second element moves the first element out of said hole against the loading of said spring to release the sleeve for movement relative to the body incident to actuating the latch means and valve means.

References Cited in the file of this patent
UNITED STATES PATENTS

| | | |
|---|---|---|
| 1,850,879 | Hunt | Mar. 22, 1932 |
| 2,514,717 | Power | July 11, 1950 |
| 2,736,578 | Rafferty | Feb. 28, 1956 |